US012789156B2

(12) United States Patent
Wessman

(10) Patent No.: US 12,789,156 B2
(45) Date of Patent: Nov. 10, 2026

(54) METHOD FOR MONITORING AND CONTROLLING THE OPERATION OF A FLOW GENERATOR

(71) Applicant: Xylem Europe GmbH, Schaffhausen (CH)

(72) Inventor: Martin Wessman, Solna (SE)

(73) Assignee: XYLEM EUROPE GMBH, Schaffhausen (CH)

( * ) Notice: Subject to any disclaimer, the term of this patent is extended or adjusted under 35 U.S.C. 154(b) by 824 days.

(21) Appl. No.: 17/948,677

(22) Filed: Sep. 20, 2022

(65) Prior Publication Data

US 2023/0101836 A1 Mar. 30, 2023

(30) Foreign Application Priority Data

Sep. 28, 2021 (EP) .................................... 21199379

(51) Int. Cl.
*B01F 35/221* (2022.01)
*B01F 23/50* (2022.01)
(Continued)

(52) U.S. Cl.
CPC ...... *B01F 35/221422* (2022.01); *B01F 23/53* (2022.01); *B01F 23/581* (2022.01);
(Continued)

(58) Field of Classification Search
CPC .. B01F 35/145; B01F 2101/305; B01F 27/25; B01F 23/2332; F04D 15/0263; C02F 3/1284; C12M 27/06
See application file for complete search history.

(56) References Cited

U.S. PATENT DOCUMENTS 3,786,996 A * 1/1974 Richter .................. F04D 29/18 416/189
4,671,872 A * 6/1987 Cramer ................ B01F 27/251 210/219
(Continued)

FOREIGN PATENT DOCUMENTS

EP 3152442 A1 4/2017
JP 4557536 B2 * 10/2010

OTHER PUBLICATIONS

Schmirler, M., Netrebska, H., (2017). The Design of Axial Shaftless Pump. EPJ Web Conferences, 143,1-4. DOI: 10.1051/epjconf/201714302104. (Year: 2017).*
(Continued)

*Primary Examiner* — Claire X Wang
*Assistant Examiner* — Patrick M Mccarty
(74) *Attorney, Agent, or Firm* — Buchanan Ingersoll & Rooney PC

(57) ABSTRACT

The invention relates to a method for monitoring and controlling the operation of a liquid flow generator (1) configured for operation in a tank (18) housing in a liquid comprising solid matter. The flow generator (1) comprises a propeller (3) and a main body (7) having a drive unit (4), wherein a control unit (4) is operatively connected to the flow generator (1) in order to monitor and control the operation of the flow generator (1), the method comprises the steps of:

a) driving the propeller (3) in a normal direction of rotation, wherein the liquid flow is directed from an upstream side of the propeller (3) towards a downstream side of the propeller (3), wherein the main body (7) is located at the upstream side of the propeller (3),
b) performing a cleaning sequence in response to a main body cleaning signal, wherein the cleaning sequence comprises the steps of:

(Continued)

i) stopping the propeller (3) from rotating in the normal direction of rotation, ii) driving the propeller (3) in a reverse direction of rotation, wherein the liquid flow is directed from the downstream side of the propeller (3) towards the upstream side of the propeller (3) and along the main body (7) in order to remove any solid matter accumulated on the main body (7), and iii) stopping the propeller (3) from rotating in the reverse direction of rotation, c) resume driving of the propeller (3) in the normal direction of rotation.

19 Claims, 2 Drawing Sheets

(51) Int. Cl.

| | |
|---|---|
| ***B01F 23/53*** | (2022.01) |
| ***B01F 35/10*** | (2022.01) |
| ***B01F 35/21*** | (2022.01) |
| ***B01F 35/32*** | (2022.01) |
| *B01F 101/00* | (2022.01) |

(52) U.S. Cl.

CPC ........ *B01F 35/145* (2022.01); *B01F 35/2115* (2022.01); *B01F 35/3204* (2022.01); *B01F 2101/305* (2022.01)

(56) References Cited

U.S. PATENT DOCUMENTS

| | | | | |
|---|---|---|---|---|
| 6,379,109 | B1 * | 4/2002 | Senior, Jr. | F04D 15/0088 210/219 |
| 10,022,688 | B2 * | 7/2018 | Keeton, Jr. | B01F 23/232311 |
| 2005/0155922 | A1 | 7/2005 | Tormaschy et al. | |
| 2008/0181792 | A1 * | 7/2008 | Cortes | F04D 13/12 417/61 |
| 2010/0034665 | A1 * | 2/2010 | Zhong | F04D 15/0066 417/42 |
| 2010/0166569 | A1 * | 7/2010 | Andy | F04D 15/0281 417/22 |
| 2011/0110794 | A1 * | 5/2011 | Mayleben | F04D 15/0218 417/313 |
| 2012/0009664 | A1 * | 1/2012 | Buerger | C12M 41/44 435/286.5 |
| 2012/0012188 | A1 * | 1/2012 | Matheis | B08B 9/032 137/15.05 |
| 2012/0134231 | A1 * | 5/2012 | Lefebvre | B01F 35/32 366/279 |
| 2013/0323084 | A1 * | 12/2013 | McIvor | H02P 29/028 417/44.1 |
| 2015/0265979 | A1 | 9/2015 | McIvor | |
| 2017/0036183 | A1 | 2/2017 | Xiang et al. | |
| 2017/0198698 | A1 * | 7/2017 | Fullemann | F04D 15/0077 |
| 2018/0057380 | A1 * | 3/2018 | Uby | C02F 3/1284 |
| 2019/0301480 | A1 * | 10/2019 | Ojima | H02K 5/1675 |

OTHER PUBLICATIONS

Liang, X. (2019). Temperature estimation and vibration monitoring for induction motors and the potential application in electrical submersible motors. Canadian Journal of Electrical and Computer Engineering, 42(3), 148-162. Doi: 10.1109/CJECE.2018.2875111. (Year: 2019).*

ABB. (May 4, 2020). Pump Cleaning [Brochure]. https://search.abb.com/library/Download.aspx?DocumentID=9AKK107680A6212&LanguageCode=en&DocumentPartId=ACQ580-PHPB07U-EN&Action=Launch. (Year: 2020).*

ABB. (Dec. 21, 2020). Pump Cleaning ACQ 580 [Brochure]. https://library.e.abb.com/public/b493fa6b83a74075a3103260ef0a653b/Pump_cleaning_guide_revA.pdf (Year: 2020).*

Extended European Search Report for European Application No. 211 99 379.5, dated Mar. 3, 2022, 9 pages.

* cited by examiner

METHOD FOR MONITORING AND CONTROLLING THE OPERATION OF A FLOW GENERATOR

The application claims priority to European Application No. 21199379.5, filed Sep. 28, 2021, incorporated herein by reference in its entirety for all purposes.

TECHNICAL FIELD OF THE INVENTION

The present invention relates generally to the field of submersible devices for agitating, mixing and/or moving liquid in a tank, wherein the liquid comprises solid matter, and to methods for monitoring and controlling the operation of such devices. These submersible machines belong to the field of submersible flow generators, or mixers having rotating propellers, wherein the flow generator is arranged to be partly or wholly lowered into the liquid/slurry. The tank is configured for temporary storing the liquid comprises solid matter, such as wastewater, sewage, biomass slurry, etc., and the present invention is intended to be used in a wastewater/sewage, treatment plant applications or digesters digester applications.

The present invention relates specifically to the field of monitoring and controlling submersible flow generators, or mixers, that comprises a propeller and a main body having a drive unit wherein the drive unit comprises an electric motor located in said main body and a drive shaft connected to the electric motor and extending from the main body. The propeller comprises a hub and a plurality of blades connected to said hub, where the hub is connected to the drive shaft and driven in rotation by said electric motor during operation of the flow generator. A control unit is operatively connected to the flow generator in order to monitor and control the operation of the flow generator.

BACKGROUND OF THE INVENTION

The flow generator is configured to be located in a tank or basin, such as a circulation channel, also known as a racetrack, or a non-circulation channel, e.g. circular or rectangular basins. The basin is for instance used during biological treatment or oxidation of a liquid, especially wastewater/sewage, or is used in digester or biogas applications. All these applications have varying temperature of the liquid, due to the process itself and/or due to ambient temperature.

In biological treatment applications the wastewater is usually purified from nitrogen and biological material by having micro organisms breaking down the biological material into carbon dioxide and water, and by having bacteria transforming the water-bound nitrogen to aerial nitrogen. Purified wastewater is released back into the nature and in the case the water-bound nitrogen is not eliminated there is a risk for eutrophication the natural watercourses, and due to the fat that the biological material is consuming considerable amounts of oxygen watercourses deficient in oxygen are generated if insufficiently purified water is released back into the nature. The breaking down of the biological material is stimulated by adding large amounts of oxygen to the wastewater by means of one or more aeration sectors, and the elimination of the water-bound nitrogen takes pace in the circulation channel in areas without added oxygen or in separate basins without added oxygen and/or in areas/basins in which the dissolved oxygen level is low enough for the process to occur. The entire processes is highly dependent on good and reliable mixing.

In digester/biogas applications the waste, for instance manure from animals, compostable waste from households, etc., is digested in order to produce biogas. The entire process is highly dependent on good and reliable mixing.

Thus, flow generating machines/mixer machines are widely used in the tanks/basins in order to mix the liquid/slurry in order to obtain an as homogenous liquid/slurry as possible, in order to keep the biological material suspended in the liquid and preventing sedimentation, as well as in order to generate a macro bulk low of liquid that circulates/flows in the tank/basin.

In said applications the equipment is often exposed to the stringy or raggy material in the liquid and this solid matter builds up layers of waste on all structural parts. The sold waste tends to wind up around the main body, propeller shafts, propeller blades and cables of the flow generator, and also wind up around other structural parts such as guide bars, sliding brackets and hoisting chains/wires that are used to lower the flow generator into the tank/basin and to hoist the flow generator from the tank/basin for service. Thereto, the liquid almost always comprises fatty material which together with the solid waste will build up large clogs.

A negative effect of such clogs building up on the main body, guide bar, chain/wire, etc. is a reduced performance (thrust), due to blocked flow path on the suction side of the propeller. Clogging of the propeller will also lead to increased power consumption and may also lead to overload and unwanted shutdown. The clogs building up on guide bar, cables, chains/wire, etc. will make it difficult to hoist the flow generator for service and lower the flow generator to the operational position in the tank. Thereto, when the flow generator is hoisted for service, the operator must spend considerable time to clean the flow generator before the actual service.

Most flow generators are equipped with safety systems that triggers an alarm when the flow generator is overloaded, for instance using a torque meter or temperature sensor, and service/cleaning is required/inevitable.

OBJECT OF THE INVENTION

The present invention aims at obviating the aforementioned disadvantages and failings of previously known methods for monitoring and controlling the operation of a flow generator in a tank, and at providing an improved method.

A primary object of the present invention is to provide an improved method for monitoring and controlling the operation of a flow generator in a tank of the initially defined type wherein the flow generator is automatically cleaned before the flow generator risks to enter an overload condition/safety mode. It is another object of the present invention to provide a method for monitoring and controlling the operation of a flow generator in a tank, wherein the bulk low of liquid in the tank is maintained also during the automatic cleaning of the flow generator, it is another object of the present invention to provide a method for monitoring and controlling the operation of a flow generator in a tank, wherein the hoisting/lowering equipment is kept clean in order to secure safe and reliable hoisting/lowering of the flow generator, it is another object of the present invention to provide a method for monitoring and controlling the operation of a flow generator in a tank, in order to be able to treat liquid having higher temperature. It is another object of the present invention to provide a method for monitoring and controlling the operation of a flow generator in a tank, in order to prolong the time interval between planned/scheduled services and to reduce the risk for unplanned service.

SUMMARY OF THE INVENTION

According to the invention at least the primary object is attained by means of the initially defined method having the features defined in the independent claim. Preferred embodiments of the present invention are further defined in the dependent claims.

According to the present invention, there is provided a method for monitoring and controlling the operation of a flow generator in a tank as initially defined % wherein the method is characterized by the steps of:

a) driving the propeller in a normal direction of rotation in order to generate a bulk flow of liquid in the tank, wherein the liquid flow is directed from an upstream side of the propeller towards a downstream side of the propeller, wherein the main body is located at the upstream side of the propeller, b) performing a cleaning sequence in response to a main body cleaning signal, wherein the cleaning sequence comprises the steps of:

i) stopping the propeller from rotating in the normal direction of rotation.

ii) driving the propeller in a reverse direction of rotation in order to generate a local flow of liquid from the downstream side of the propeller towards the upstream side of the propeller and along the main body in order to remove any solid matter accumulated on the main body, and iii) stopping the propeller from rotating in the reverse direction of rotation, c) resume driving of the propeller in the normal direction of rotation, wherein the duration of the reverse operation of the propeller during the cleaning sequence is equal to or more than 5 seconds and is equal to or less than 60 seconds; and wherein the rotational speed of the flow generator during the reverse operation of the propeller during the cleaning sequence k equal to or more than 25% of the max rotational speed of the flow generator and is equal to or less than 100% of the max rotational speed of the flow generator.

Thus, the present invention is based on the insight of the inventor that when the main body of the flow generator is covered by large amounts of solid matter, the cling of the flow generator is severely reduced sine the cooling of the flow generator is achieved by the propelled liquid flowing along the main body on the upstream side of the propeller during normal operation. Thus, clogs building up on the main body and the other structural parts, will have negative effect on the amount of liquid flowing along the main body and also acts as an undesired insulation layer on the main body. The inventor has also realized that the temperature of the internal components of the flow generator is crucial, since an elevated temperature will be judged as an overload and the flow generator will enter a safety made, i.e. be shut off or having reduced rotational speed and call for service. Haing an insulated main body together with high temperature in the liquid, the temperature of the internal components will trigger the safety mode more often, leading to negative effect on the process in the tank. Thus, according to the inventor, the key is to keep the temperature of the internal parts of the flow generator as low as possible by keeping the structural parts as clean as possible, since the temperature of the liquid in the tank is more or less impossible to adjust. The invention is based on providing a main body cleaning signal and performing a cleaning sequence wherein the structural parts are cleaned without having negative effect on the bulk flow of liquid in the tank. The main body cleaning signal may be accomplished according to various ways within the scope of the present invention as will be explained.

According to various embodiments of the present invention, the main body cleaning signal is triggered on a time-based condition, the time-based condition comprising a time interval between two consecutive main body cleaning signals, wherein the time interval is equal to or more than 15 minutes and is equal to or lets than 1440 minutes.

This means that at least once per 24 hours the main body cleaning signal and thereby the cleaning sequence is performed, however, for many applications this is not enough and it is preferred that the cleaning sequence is performed about once per hour. Should the time-based cleaning be performed more often than every 15 minutes the bulk flow of liquid would become affected.

According to various embodiments of the present invention, the flow generator comprises a temperature sensor located in the main body, wherein the main body cleaning signal is triggered on a temperature based condition, the temperature-based condition comprising a predetermined temperature threshold, wherein the mixer body cleaning signal is triggered in response to the temperature of the temperature sensor exceeding said temperature threshold.

This means that a temperature sensor is positioned in the main body at a suitable location, wherein the combination of temperature threshold and location of the temperature sensor is chosen such that the main body cleaning signal is provided for a condition that is distanced the triggering of a safety/alarm mode, such that the operation of the flow generator may safely proceed. Such temperature threshold will result in detection of slow increase in temperature in the main body due to slow building up of clogging.

According to various embodiments of the present invention, the flow generator comprises a temperature sensor located in the main body, wherein the main body cleaning signal is triggered on a temperature-based condition, the temperature-based condition comprising a predetermined temperature derivative threshold, wherein the mixer body cleaning signal is triggered in response to the derivative of the temperature change of the temperature sensor exceeding said temperature derivative threshold.

This means that a temperature sensor is positioned in the main body at a suitable location, wherein the change of temperature in the main body is monitored in order to detect rapid increase in temperature is the main body due to fast building up of clogging. These embodiments will result in an early detection also well below a possible temperature threshold.

It shall be pointed out that these various embodiments of generating main body leaning signal may be used independently, in parallel with each other, in combination with each other, etc.

According to various embodiments of the present invention, wherein the rotational speed of the flow generator during the reverse operation of the cleaning sequence is higher in response to temperature-based triggering than in response to time-based triggering.

This means that the time-based triggering of the main body cleaning signal is used as a back cleaning and/or maintenance cleaning and then the rotational speed during the reverse operation is lower in order to have as little effect on the bulk low of liquid in the tank as possible, and a temperature-based triggering of the main body cleaning signal is used when clogging is detected and the demand to remove the logging solid matter justifies a higher rotational speed during the reverse operation in spite of the fact that the risk of negatively effecting the bulk flow of liquid in the tank increases.

Further advantages with and features of the invention will be apparent from the other dependent claims as well as from the following detailed description of preferred embodiments.

BRIEF DESCRIPTION OF THE DRAWINGS

A more complete understanding of the abovementioned and other features and advantages of the present invention will be apparent from the following detailed description of preferred embodiments in conjunction with the appended drawings, wherein.

DETAILED DESCRIPTION OF PREFERRED EMBODIMENTS OF THE INVENTION

Figure 1:
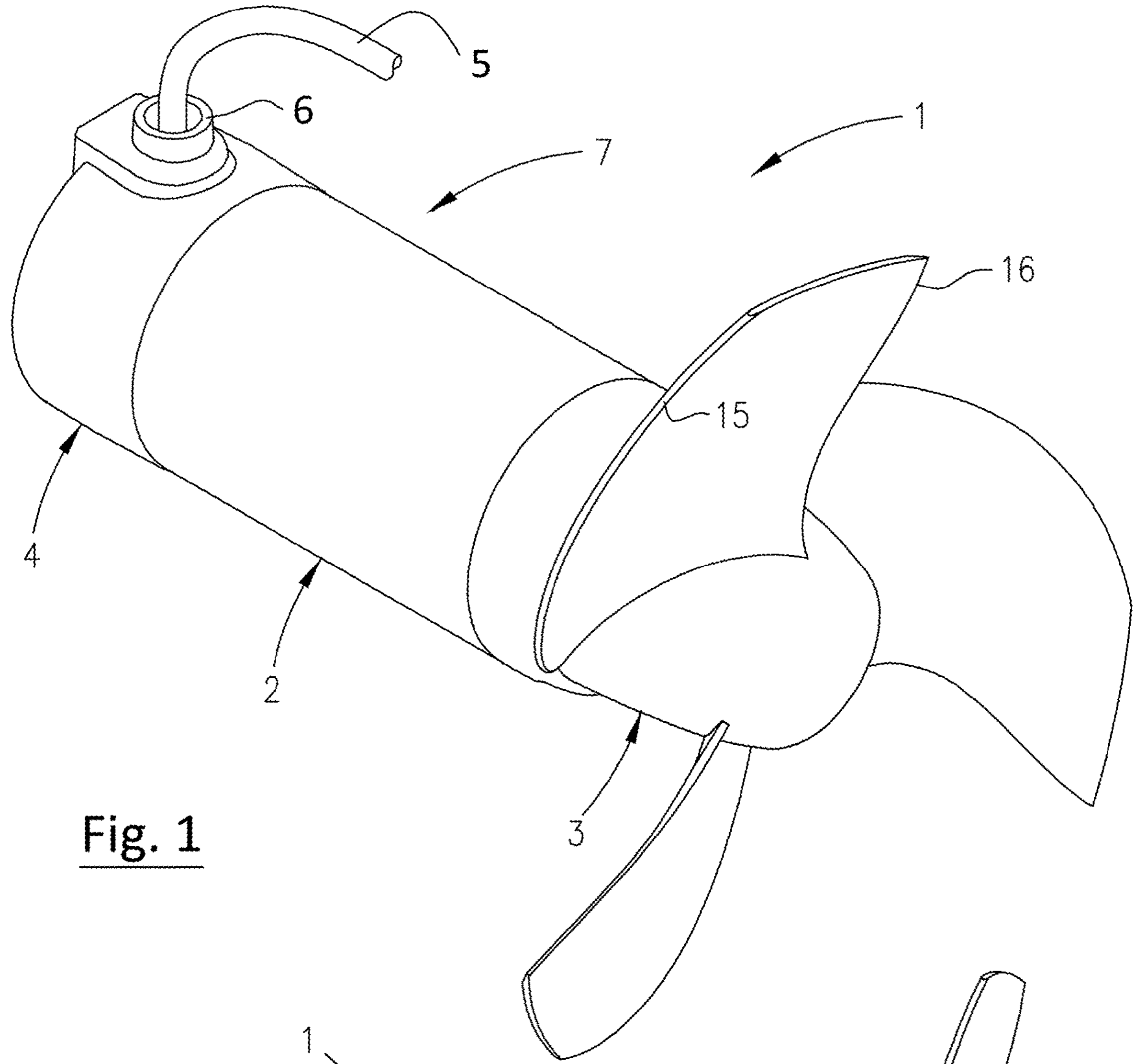
FIG. 1 is a schematic perspective view of an inventive flow generator.
Figure 2:
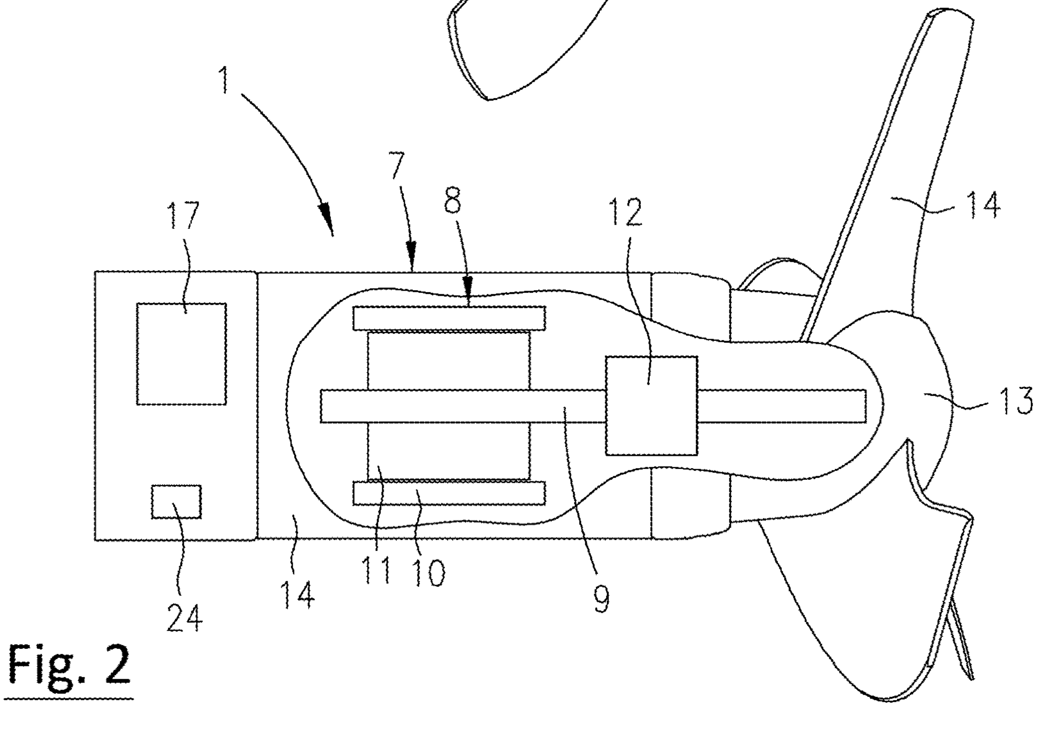
FIG. 2 is a schematic cross sectional side view of the flow generator according to FIG. 1.

Reference is initially made of FIGS. 1 and 2. The present invention relates especially to a flow generator or mixer, generally designated 1, suitable for treatment/transportation of liquid comprising solid matter, such as wastewater/sewage/biomass slurry, and relates especially to a method for monitoring and controlling the operation of such a flow generator 1.

The flow generator 1 is a submersible mixer machine and comprises three major parts, a drive unit, generally designated 2, a rotatable impeller/propeller 3 and a control unit 4. The control unit 4 monitors and controls the operation of the flow generator 1. The drive unit 2 drives the propeller 3 in rotation and the propeller 3 propels the liquid, i.e. provides thrust to the liquid. The drive unit 2 and the propeller 3 are always part of the flow generator 1, and in the disclosed embodiment the control unit 4 is integrated into and constitutes a part of the flow generator 1. In an alternative embodiment the control unit 4 is constituted by a separate member and is operatively connected to the flow generator 1. The flow generator 1 is also commonly called mixer machine or mixer. In the disclosed embodiment the flow generator is a submersible flow generator, i.e. configured to be located entirely submerged. However ft shall be pointed out that a submersible flow generator 1 can be partly located above the liquid-surface during operation. The flow generator 1 is cooled by the liquid surrounding the drive unit 2.

An electric cable 5 extending from a power supply, for instance the power mains, provides power to the flow generator 1, the flow generator 1 comprising a liquid tight lead-through 6 receiving the electric cable 5. The electric cable 5 may also comprise signal wires for data communication between the ow generator and an externa control unit (not shown). A main body comprises, in the present embodiment, the control unit 4 and the drive unit 2.

In FIG. 2 some internal parts of the flow generator 1 are schematically disclosed. The drive unit 2 comprises an electric motor, generally designated 8, and a drive shaft 9 connected to and driven in rotation by said electric motor during operation of the flow generator 1. The electric motor 8 comprises in a conventional way a stator 10 and a rotor 11. The main body 7 is located upstream the propeller 3 during normal operation of the flow generator 1.

In the disclosed embodiment the drive shaft 9 comprises a rear end portion connected to and co-rotational with the rotor 11 in a conventional way and a forward end portion connected to and co-rotational with the propeller 3 in a conventional way wherein a mechanical transmission unit 12 is arranged between the rear end portion and the forward end portion. The transmission unit 12 may have a fixed gear ratio wherein the propeller 3 has a lower rotational speed than the rotor 11 of the electric motor 8, i.e. reduced gearing. The gear ratio is preferably equal to or less than 60:1, and preferably equal to or higher than 15:1. According to alternative embodiments the gear ratio is 1:1, i.e. no gearing wherein the rear end portion and the forward end portion are constituted by the same shaft member. The drive unit also comprises necessary bearings and seals (not shown). The rotational speed of the impeller/propeller 3 i.e. the operational speed of the flow generator 1 during normal operation of the flow generator 1 is equal to or less than 1000 μm, and equal to or higher than 70 rpm.

In the disclosed embodiment the rear end portion and the forward end portion of the drive shaft 9 both extends in an axial direction, and are preferably collinear. According to alternative embodiments the mechanical transmission unit 12 is angled, i.e. it is an angle between the rear end portion and the forward end portion of the drive shaft 9, for instance 90 degrees.

The electric motor 8 is located in the main body/housing 7 and in the disclosed embodiment the propeller 3 is located in direct contact with the main body 7, the main body 7 being a liquid tight housing. However, in alternative embodiments the propeller 3 is located at a distance from the main body 7, i.e. the drive shaft 9 is visible between the main body 7 and the propeller 3.

The propeller 3 comprises a hub 13 connected to the drive shah 9 and a plurality of blades 14 connected to said hub 13 wherein the drive shaft 9 extends in an axial direction and each blade 14 extend in a radial direction seen from its base to its top wherein each blade 14 is connected to the hub 13 at its base and wherein the top of the blade 14 is the outermost part of the propeller 3. In the disclosed embodiment both the leading edge 15 and the trailing edge 16 of the blade 14 are curved the leading edge 15 is convex and the trailing edge 16 is concave. It shall be pointed out that the blades 14 naturally also have an extension in the axial direction, i.e. has a pitch, in order to generate thrust to the liquid.

The control unit 4 is operatively connected to the electric motor 3 the control unit 4 being configured for monitoring and controlling the operation of the flow generator 1. The electric motor 8 is configured to be driven in operation by the control uint 4. Thu, the control unit 4 is configured to control the rotational speed at which said electric motor 8 of the flow generator is to be driven for instance by controlling the frequency of the current operating the electric motor. According to the disclosed embodiment, the control unit 4 comprises a Variable Frequency Drive (VFD) 17. Thus, the flow generator 1 is configured to be operated at variable operational speed (n). The control unit 4 is configured to perform the inventive method.

Figure 3:
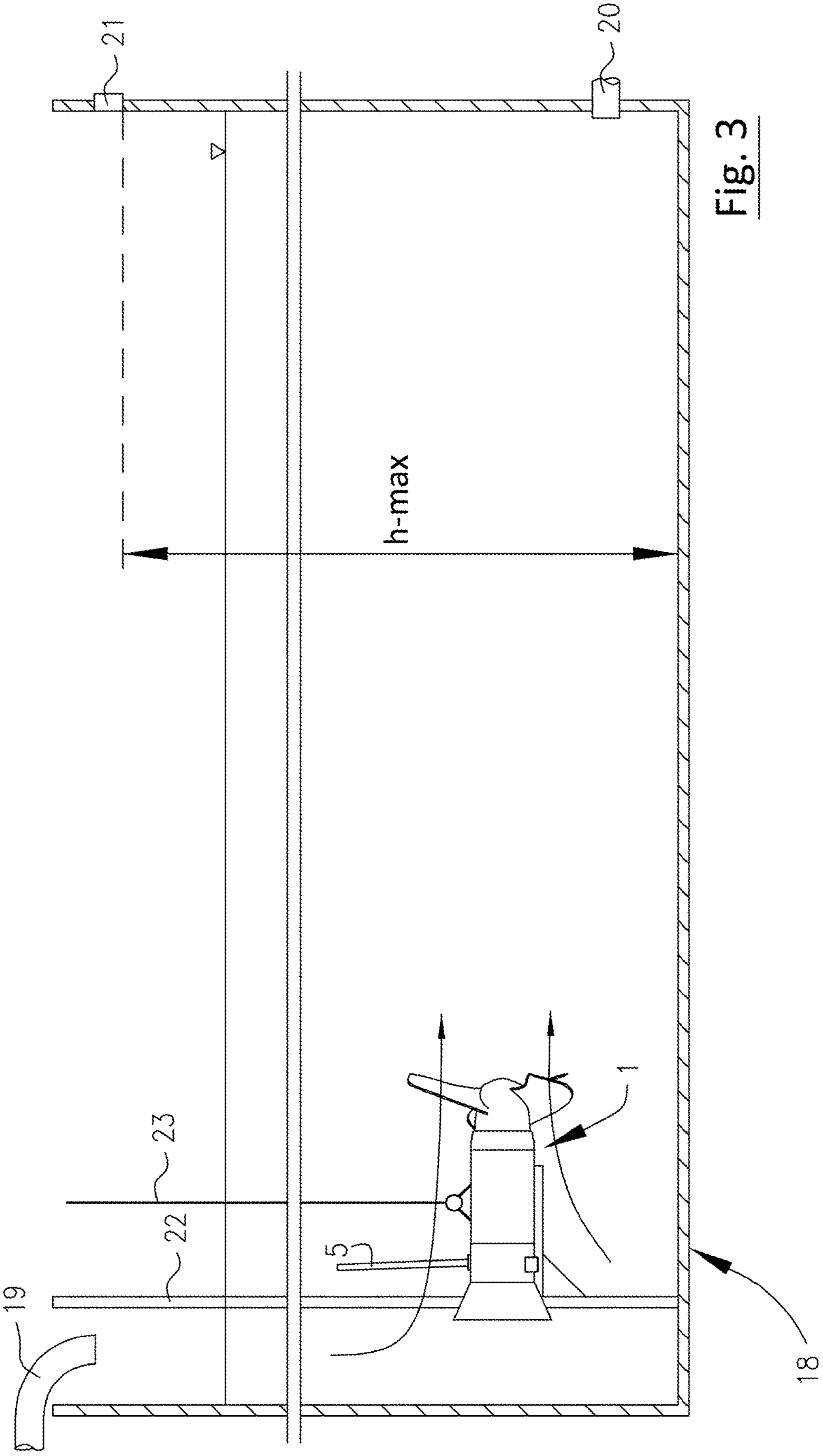
FIG. 3 is a schematic side view of a tank comprising such a flow generator.

Reference is now also made to FIG. 3 wherein the flow generator 1 is located in a tank 18 that is configured for housing the liquid comprising solid matter. Thus, the control unit 4 that is configured for operating the flow generator 1 at variable operational speed (n), i.e. rpm of the impeller/propeller 3. The flow generator 1 is provided with a max operational/rotational speed which is the operational speed/thrust required when the liquid level in the tank 18 is equal to the maximum filling height (h-max), in order to obtain sufficient and appropriate mixing fuel mixing. It shall be pointed out that the specific flow generator 1 in a specific application may be dimensioned for operational/rotational speeds above said max operational speed, however when sizing the flow generator 1 one tries to have the smallest possible flow generator 1 capable of performing the necessary mixing in order to save costs. It shall be pointed out that the present liquid level lathe tank 18 may be below the maximum filling height.

The tank 18 comprises an inlet 19 to admit liquid to enter the tank 18 and an outlet 20 through which the liquid is removed/discharged from the tank 18. The liquid may be pumped into the tank 18 and/or arranged to flow by means of gravity into the tank 18, and the liquid may be pumped from the tank 18 and/or arranged to flow by means of gravity from the tank 18.

The tank 18 has a predetermined maximum filling height (h-max), for instance defined by the vertical distance between at overflow outlet 21 and the floor of the tank 18. The maximum filling height (h-max) is usually equal to or more than 2 meters and equal to or less than 15 meters.

The tank 18 may comprise several flow generators wherein one or more are controlled in accordance with the present invention. The flow generator 1 is located at a height in the tank 18 during operation, and the height of the flow generator 1 may be fixed or adjustable in the disclosed embodiment the flow generator 1 is arranged to be guided along and by means of a guide bar 22 by being hoisted or lowered in a chain/wire 23. The guide bar 22, wire/chain 23 and a runner at the back of the flow generator 1, i.e. the hosting/lowering equipment are also exposed for fouling and are cleaned by the inventive method.

The inventive method comprises the steps of:

a) driving the propeller 3 in a normal direction of rotation in order to generate a bulk flow of liquid in the tank 18, wherein the liquid flow is directed from an upstream side of the propeller 3 towards a downstream side of the propeller 3, wherein the main body 7 is located at the upstream side of the propeller 3, b) performing a cleaning sequence in response to a main body cleaning signal, wherein the cleaning sequence comprises the steps of.

i) stopping the propeller 3 from rotating in the normal direction of rotation, ii) driving the propeller 3 in a reverse direction of rotation in order to generate a local flow of liquid from the downstream side of the propeller 3 towards the upstream side of the propeller 3 and along the main body 7 in order to remove any solid matter accumulated on the main body 7, and iii) stopping the propeller 3 from rotating in the reverse direction of rotation, c) resume driving of the propeller 3 in the normal direction of rotation, wherein the duration of the reverse operation of the propeller 3 during the cleaning sequence is equal to or more than 5 seconds and is equal to or less than 60 second, and wherein the rotational speed of the flow generator 1 during the reverse operation of the propeller 3 during the cleaning sequence is equal to or more than 25% of the max rotational speed of the flow generator 1 and is equal to or less than 100% of the max rotational speed of the flow generator 1.

Thus, during the cleaning sequence there is a local flow of liquid at the flow generator 1, which does not extinguish the bl flow of liquid in the tank 18, wherein the local flow of liquid will flush away the solid matter accumulated on the main body 7, the guide bar 2, the chain/wire 23, etc.

The duration of the reverse operation of the propeller 3 must not be too long, since a too long reverse operation will increase the risk that the bk ow of liquid in the tank is negatively affected. Thereto, the duration of the reverser operation of the propeller 3 must not be too short, since a too short reverse operation will not provide sufficient gush away of accumulated sold matter. Similarly, the rotational speed during the reverse operation of the propeller 3 must not be too low, since a too low operational speed will not provide sufficient flush away of accumulated solid matter.

According to various embodiments, the rotational speed of the flow generator 1 during the reverse operation of the propeller 3 during the cleaning sequence is equal to or more than 50% of the max rotational speed of the flow generator 1.

There is a correlation between the operational speed and the duration of the reverse operation of the propeller 3. In situations/applications the rotational speed is 100% of the max rotational speed, the duration can be in the lower part of the stipulated range of duration and in situations/applications the rotational speed is 25% of the max rotational speed, the duration can being the upper part of the stipulated range of duration, for a specific/optimized combination of flow generator 1 and tank 18.

According to various embodiments the duration of the reverse operation of the propeller 3 during the cleaning sequence is equal to or more than 15 seconds is equal to or less than 30 seconds. In this more limited duration range there is no need to know the rotational speed within the set range, i.e. the entire rotational speed range stipulated above is valid in this more limited duration range.

Thereto, the information about the more limited duration range entails that in situations/applications the rotational speed is 100% of the max rotational speed, the duration is preferably in the range 5-40 seconds, and in situations/applications the rotational speed is 25% of the max rotational speed, the duration is preferably in the range 15-60 seconds.

According to various embodiments the rotational speed of the flow generator 1 during the reverse operation of the propeller 3 during the cleaning sequence is equal to or more than 60% of the ma rotational speed of the flow generator 1 and is equal to or less than 80% of the max rotational speed of the flow generator 1 within the set range in this more limited rotational speed range there is no need to know the duration, i.e. the entire duration range stipulated above is valid in this more limited rotational speed range.

Thereto, the information about the more limited rotational speed range entails that in situations/applications the rotational speed sin the range 60-100% of the max rotational speed the duration is preferably in the range 5-30 seconds, and in situations/applications the rotational speed is in the range 25-60% of the max rotational speed, the duration is preferably in the range 1.5-60 seconds.

The rational speed of the flow generator 1 in the normal/forward direction of rotation during step and c) is determined for the specific application, i.e. size of flow generator 1, size/type of tank 1, type of liquid/slurry, etc. For instance the rotational speed in the normal/forward direction of rotation is in the range 70-80% of the max rotational speed.

During the cleaning sequence, according to various embodiments, after the step of stopping the propeller 3 from rotating in the normal direction of rotation, the control unit 4 verifies that the propeller 3 is standing still before initiating the reverse operation of the propeller 1. One way of verifying stand still is that no current/power is used by the electric motor, or that the output frequency from the control unit 4 to the electric motor 8 is zero. Alternatively, the propeller 3 is allowed to freewheel after stopping the forward operation of the propeller 3, but in such conditions the propeller 3 will be slowly rotated in the normal direction of rotation by the bulk flow of liquid.

During the cleaning sequence according to various embodiments, after the step of stopping the propeller 3 from rotating in the reverse direction of rotation, the control unit 4 verifies that the propeller 3 is standing still before resuming the normal operation of the propeller 3 after the cleaning sequence. One way of verifying stand still is that no current/power is used by the electric motor 8, or that the output frequency from the control unit 4 to the electric motor 8 is zero. Alternatively, the propeller 3 is allowed to freewheel after stopping the backward operation of the propeller 3, but in such conditions the propeller 3 will be slowly rotated in the normal direction of rotation by the bulk flow of liquid.

Thus, stopping the propeller 3 means that the rotational speed of the propeller 3 is decreased in a controlled manner by the control unit 4 and/or by disengaging the control unit 4 from the electric motor 8.

According to various embodiments, the main body cleaning signal is triggered on a time-based condition. The time-based condition comprising a time interval between two consecutive main body cleaning signals, wherein the time interval is equal to or more than 15 minutes and is equal to or less than 1440 minutes (24 hours). The time interval is preferably equal to or more than 30 minutes and equal to or less than 360, and most preferably about 60 minutes. The duration of the entre cleaning sequence is about t minute.

According to various embodiments, the flow generator 1 comprising a temperature sensor 24 located in the main body 7, wherein the main body cleaning signal is triggered on a temperature-based condition, the temperature-based condition comprising a predetermined temperature threshold, wherein the main body cleaning signal is triggered in response to the temperature of the temperature sensor 24 exceeding said temperature threshold.

It is preferred that the temperature sensor 24 is located in the control unit 4 portion of the flow generator 1, but itis also conceivable that the temperature sensor 24 is located in direct vicinity to the electric motor 8, i.e. in the motor compartment of the main body 7. It is also conceivable to have both types of temperature sensors.

According to various embodiments, the temperature threshold is equal to or more than 50° C. and is equal to or less than 150° C. In applications the temperature sensor 24 is located in the control unit 4 portion, the temperature threshold is in the range 50-100° C. preferably equal to or more than 60° C. and equal to or less than 80° C. In applications the temperature sensor 24 is located at or in the electric motor 8, the temperature threshold is in the range 100-150° C. Each degree above a normal reference temperature level will have negative effect on the expected life of the flow generator 1 and the time interval between service will decrease. Thus, the temperature threshold is dependent on the normal/reference temperature of the specific flow generator 1 and application. Thanks to the present invention, i.e. secure proper cooling of the flow generator by having no accumulation of solid matter on the main body 7, the temperature of the liquid/slurry surrounding the flow generator 1 is allowed to be higher than before.

According to various embodiments, the main body cleaning signal is triggered on a temperature-based condition, the temperature-based condition comprising a predetermined temperature derivative threshold, wherein the main body cleaning signal is triggered in response to the derivative of the temperature change of the temperature sensor 24 exceeding said temperature derivative threshold. Thereby a sudden increase of the temperature will give an early indication that a large piece of solid matter obstructs the flow of liquid along the main body 7 during normal operation of the flow generator 1, and thereby the cooling is negatively affected. In response to a triggering of the main body cleaning signal based on temperature derivative threshold, it is preferred to perform two or three leaning sequences with a time interval of 10-15 minutes and normal operation therebetween since the rapid increase of temperature indicates a large/single piece of solid matter obstructing the flow of liquid along the main body and it is important to rapidly remove such solid matter.

The temperature derivative threshold is equal to or more than 2° C. per 5 minutes and is equal to or less than 10° C. per 5 minutes. Preferably the temperature derivative threshold is equal to or more than 3° C. per 5 minutes and is equal to or less than 5° C. per 5 minutes.

It shall be pointed out that different triggering of the main body cleaning signal may be used in combination, i.e. time-based as well as temperature-based. Another triggering of the main body cleaning signal is a manual triggering, on site or remotely.

Triggering of the main body cleaning signal based on temperature derivative threshold will take place also when the temperature is well below the temperature threshed. It is preferred that the rotational speed of the flow generator 1 during the reverse operation of the cleaning sequence is higher in response to a temperature-based triggering than in response to a time-based triggering. Thus, a temperature-based triggering of the main body cleaning signal is direct associated with accumulation of solid matter obstruction the flow of liquid/slurry along the main body 7 during normal operation of the flow generator 1 and the time-based triggering is more of a safety measure should the temperature sensor 24 malfunction. For Instance the rotational speed during reverse operation in response to temperature-based triggering is in the range 20-100% higher than the rotational speed during reverse operation in response to time-based triggering, preferably about 50-60% higher.

For the same reason, it is also preferred that the duration of the reverse operation of the cleaning sequence is greater in response to a temperature-based triggering than in response to a time-based triggering. For instance the duration of the reverse operation in response to temperature-based triggering is in the range 20-100% longer than the duration a the reverse operation in response to time-based triggering, preferably about 50-60% longer.

According to various embodiments, wherein the flow generator 1 comprises a temperatures sensor 24 the step of b) performing a cleaning sequence in response to a main body cleaning signal of the inventive method comprises more substeps concerning a temperature test after cleaning. More precisely the cleaning sequence comprises the steps of:

i) stopping the propeller 3 from rotating in the normal direction of rotation, ii) driving the propeller 3 in a reverse direction of rotation in order to generate a local flow of liquid from the downstream side of the propeller 3 towards the upstream side of the propeller 3 and along the main body 7 in order to remove any solid matter accumulated on the main body 7, iii) stopping the propeller 3 from rotating in the reverse direction of rotation, iv) in response to the temperature of the temperature sensor 24 exceeding a temperature threshold during the step of iii) stopping the propeller 3 from rotating in the reverse direction of rotation, driving the propeller 3 in the normal direction a predetermined time period that is equal to or more than 10 minutes and is equal to or ess than 20 minutes and after driving the propeller 3 in the normal direction for the predetermined time period, returning to the step of i) stopping the propeller 3 from rotating in the normal direction of rotation, or, in response to the temperature of the temperature sensor 24 being at or below the temperature threshold proceeding to step c) resume driving of the propeller 3 in the norma direction of rotation.

Thus, these embodiments of the inventive method comprise a cleaning sequence loop in response to the main body cleaning signal is temperature-based triggered and the temperature does not decrease under the threshold during the stopping of the propeller 3 from rotating in the reverse direction. The leaning sequence loop continues until the threshold is no longer exceeded.

According to various embodiments comprising the cleaning sequence loop, an alarm "cleaning failed" is triggered in response to five cleaning sequence oops of returning to step i) of the cleaning sequence being performed and the temperature of the temperature sensor 24 exceeding the temperature threshold during the cleaning sequence loop step of ii) stopping the propeller 24 from rotating lathe reverse direction of rotation. In response to the triggering of the alarm "cleaning failed" the flow generator 1 preferably enters a safety mode, i.e. operation having a decreased operational speed and operation in the normal/forward direction until service is performed.

As an alternative, after a cleaning sequence and the step of c) resume driving of the propeller 3 in the norma direction of rotation has been initiated, the temperature test after cleaning is performed in response to the temperature of the temperature sensor 24 exceeding a temperature threshold during step c) after a cleaning sequence, driving the propeller 3 in the normal direction a predetermined time period that is equal to or more than 10 minutes and is equal to or less than 20 minutes and thereafter returning to step b) performing a cleaning sequence. Said predetermined time period shall be shorter than the normal time interval between two consecutive main body cleaning signals for time-based triggering of the main body cleaning signal.

When entering a cleaning sequence loop, the duration and/or rotational speed of the flow generator 1 increases each new cleaning sequence. For instance the duration will increase by 5 seconds each cleaning sequence and/or the rotational speed of the flow generator 1 will increase by 5% of the max rotational speed.

According to various embodiments the default value of the duration of the cleaning sequence is about 20 seconds. According to various embodiments, the default value of the rotational speed is about 50% of the max rotational speed.

Following a cleaning sequence loop, the default values of duration and rotational speed for a cleaning sequence may be updated.

The flow generator 1 comprises means adapted to execute the steps of the above method. Many of the steps of the above method are preferably performed/controlled by the control unit 4, and thus the term "the Now generator 1 comprises means . . . " does not necessarily imply that said means has to be located within the main body 7. Thus the term also includes means accessible/available operatively connected to the mixer machine.

A computer program product/package comprising instructions to cause the flow generator 1 to execute the steps of the above method, is accessible/available/operatively connected to the flow generator 1. Said computer program product is preferably located/run in the control unit 4. Thus, the computer readable storage medium has computer-readable program code portions embedded therein, wherein the computer-readable program code portions when executed by a computer cause the computer to carry out the steps of the described method.

Feasible Modifications of the Invention

The invention is not limited only to the embodiments described above and shown in the drawings, which primarily have an illustrative and exemplifying purpose. This patent application is intended to cover all adjustments and variants of the preferred embodiments described herein, thus the present invention is defined by the wording of the appended claims and the equivalents thereof. Thus, the equipment may be modified in all kinds of ways within the scope of the appended claims.

It shall also be pointed out that all information about/concerning terms such as above, under, upper, lower, etc., shall be interpreted/read having the equipment oriented according to the figures, having the drawings oriented such that the references can be properly read. Thus, such terms only indicate mutual relations in the shown embodiments, which relations may be changed if the inventive equipment is provided with another structure/design.

It shall also be pointed out that even thus it is not explicitly stated that features from a specific embodiment may be combined with features from another embodiment, the combination shall be considered obvious, if the combination is possible.

Throughout this specification and the claims which flows, unless the context requires otherwise, the word "comprises", and variations such as "comprise" or comprising will be understood to imply the inclusion of a stated inter or steps or group of integers or steps but not the exclusion of any other integer or step or group of integers or steps.

The invention claimed is:

1. A method for monitoring and controlling the operation of a mixer configured for operation in a tank housing a liquid comprising solid matter, the mixer comprising a propeller openly exposed to the liquid in the tank, a main body having a drive unit, and a temperature sensor located in the main body, wherein the drive unit comprises an electric motor located in said main body and a drive shaft connected to the electric motor and extending from the main body, wherein the propeller comprises a hub and a plurality of blades connected to said hub, wherein the hub is connected to the drive shaft and driven in rotation by said electric motor during operation of the mixer, a control unit being operatively connected to the mixer in order to monitor and control the operation of the mixer, the method comprises the steps of:

a) driving the propeller in a normal direction of rotation in order to generate a bulk flow of liquid that circulates in the tank, wherein the bulk flow of liquid that circulates in the tank is directed from an upstream side of the propeller towards a downstream side of the propeller, wherein the main body is submerged in the liquid and located at the upstream side of the propeller, b) performing a cleaning sequence in response to a main body cleaning signal, wherein the cleaning sequence comprises the steps of:

i) stopping the propeller from rotating in the normal direction of rotation, ii) conducting a reverse operation of the propeller comprising driving the propeller in a reverse direction of rotation in order to generate a local flow of liquid from the downstream side of the propeller towards the upstream side of the propeller and along the main body in order to remove any solid matter accumulated on the main body, and iii) stopping the propeller from rotating in the reverse direction of rotation, c) resuming driving of the propeller in the normal direction of rotation, wherein the duration of the reverse operation of the propeller during the cleaning sequence is equal to or more than 5 seconds and is equal to or less than 60 seconds, wherein a rotational speed of the mixer during the reverse operation of the propeller during the cleaning sequence is equal to or more than 25% of a max rotational speed of the mixer and is equal to or less than 100% of the max rotational speed of the mixer.

2. The method according to claim 1, wherein the control unit verifies that the propeller is standing still before initiating the reverse operation of the propeller during the cleaning sequence.

3. The method according to claim 1, wherein the control unit verifies that the propeller is standing still before resuming driving of the propeller in the normal direction of rotation after the cleaning sequence.

4. The method according to claim 1, wherein the duration of the reverse operation of the propeller during the cleaning sequence is equal to or more than 15 seconds and is equal to or less than 30 seconds.

5. The method according to claim 1, wherein the rotational speed of the mixer during the reverse operation of the propeller during the cleaning sequence is equal to or more than 60% of the max rotational speed of the mixer and is equal to or less than 80% of the max rotational speed of the mixer.

6. The method according to claim 1, wherein an alarm "cleaning failed" is triggered in response to the cleaning sequence returning to the step of i) stopping the propeller from rotating in the normal direction of rotation five times and the temperature of the temperature sensor exceeding a temperature threshold during the step of iii) stopping the propeller from rotating in the reverse direction of rotation for each of the five times.

7. The method according to claim 1, wherein the control unit is configurable to trigger the main body cleaning signal based on a time-based condition and a temperature-based condition, and wherein at least one of the rotational speed of the mixer or the duration of the reverse operation of the propeller during the cleaning sequence is greater in response to the main body cleaning signal when triggered based on the temperature-based condition than when triggered based on the time-based condition.

8. The method according to claim 1, wherein the main body cleaning signal is triggered on a temperature-based condition, the temperature-based condition comprising a predetermined temperature derivative threshold, wherein the main body cleaning signal is triggered in response to a derivative of a temperature change of the temperature sensor exceeding said predetermined temperature derivative threshold.

9. The method according to claim 8, wherein the temperature derivative threshold is equal to or more than 2° C. per 5 minutes and is equal to or less than 10° C. per 5 minutes.

10. The method according to claim 1, wherein the main body cleaning signal is triggered on a temperature-based condition, the temperature-based condition comprising a predetermined temperature threshold, wherein the main body cleaning signal is triggered in response to the temperature of the temperature sensor exceeding said temperature threshold.

11. The method according to claim 10, wherein the temperature threshold is equal to or more than 50° C. and is equal to or less than 150° C.

12. The method according to claim 10, wherein the rotational speed of the mixer during the reverse operation of the propeller during the cleaning sequence is higher in response to temperature-based triggering than in response to time-based triggering.

13. The method according to claim 10, wherein the duration of the reverse operation of the propeller during the cleaning sequence is greater in response to temperature-based triggering than in response to time-based triggering.

14. The method according to claim 1, wherein the main body cleaning signal is triggered on a time-based condition, the time-based condition comprising a time interval between two consecutive main body cleaning signals, wherein the time interval is equal to or more than 15 minutes and is equal to or less than 1440 minutes.

15. The method according to claim 14, wherein the rotational speed of the mixer during the reverse operation of the propeller during the cleaning sequence is higher in response to temperature-based triggering than in response to time-based triggering.

16. The method according to claim 14, wherein the duration of the reverse operation of the propeller during the cleaning sequence is greater in response to temperature-based triggering than in response to time-based triggering.

17. The method according to claim 14, wherein the time interval is equal to or more than 30 minutes and is equal to or less than 360 minutes.

18. The method according to claim 14, wherein the time interval is equal to 60 minutes.

19. A non-transitory computer-readable storage medium having computer-readable program code portions embedded therein, wherein the computer-readable program code portions when executed by a computer cause the computer to carry out the steps of the method according to claim 1 in order to perform a cleaning of the mixer.

* * * * *